Patented Sept. 16, 1952

2,610,972

UNITED STATES PATENT OFFICE 2,610,972

SYNTHESIS OF ORGANIC PEROXIDES

Tod W. Campbell, Orinda, and Galvin M. Coppinger, El Cerrito, Calif., assignors to the United States of America as represented by the Secretary of Agriculture No Drawing. Application August 24, 1951, Serial No. 243,571

11 Claims. (Cl. 260—396)

(Granted under the act of March 3, 1883, as amended April 30, 1928; 370 O. G. 757)

The invention herein described may be manufactured and used by or for the Government of the United States of America for governmental purposes throughout the world without the payment to us of any royalty thereon.

This invention relates to the preparation of organic peroxide compounds. The objects of this invention include the provision of novel methods for preparing organic peroxides and the provision of the new compounds produced thereby. Further objects of this invention will be obvious from the description herein.

The compounds with which this invention is concerned are peroxide derivatives of cyclohexadiene and can be represented by the formulae:

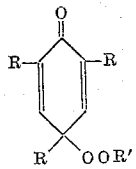

and

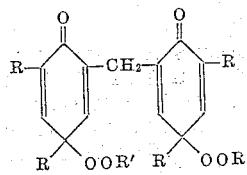

wherein: the R's are the same or dissimilar alkyl radicals as for example, methyl, ethyl, propyl, isopropyl, butyl, isobutyl, sec. butyl, tert. butyl, and so forth.

The radicals represented by R' are the same or dissimilar hydrocarbon or substituted hydrocarbon radicals and may be of the alkyl, aromatic, or cycloalkyl category. Examples are tert. butyl, cyclohexyl, hydroxycyclohexyl, phenyl, p-tert butyl-phenylisopropyl, tetralyl, and so forth.

These compounds are useful as intermediates for chemical syntheses and as promoters for polymerization reactions.

In synthesizing the compounds of this invention, we react an organic hydroperoxide with a 2,4,6-trialkyl phenol, preferably in the presence of a catalyst such as cobalt naphthenate. The reaction may be represented by the equation:

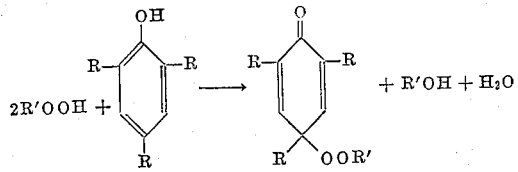

Carrying out the reaction involves first the selection of the appropriate 2,4,6-trialkyl phenol. The alkyl groups in the phenol can be the same or dissimilar and may be for example methyl, ethyl, propyl, isopropyl, butyl, sec-butyl, isobutyl, tert.-butyl, and so forth. As the other reactant one may use any organic hydroperoxide. Naturally, the reactivity of various hydroperoxides will differ depending on the radical to which the —OOH group is attached. We have found rapid reaction rates and good yields to be obtained with tertiary butyl hydroperoxide, 1-hydroxycyclohexyl hydroperoxide, p-tert.-butylphenylisopropyl hydroperoxide, and tetralin hydroperoxide. As can be seen in the preceding equation, 2 moles of the hydroperoxide are required for each mole of phenol. Usually, an excess of the hydroperoxide over this proportion is used to ensure complete reaction. Any remainder of hydroperoxide after completion of the reaction is decomposed or vaporized when the solvent is boiled off. The reactants are preferably dissolved in an inert solvent as for example methanol, ethanol, propanol, tert butyl alcohol, benzene, toluene, ethyl acetate, and so forth. The reaction is preferably conducted by heating on the steam bath and in general the temperature may range from about 60° to about 100° C. A reflux condenser may be used to prevent loss of solvent during the reaction. It has been found that catalysts will accelerate the reaction; thus a trace of cobalt naphthenate will at least quadruple the rate of reaction. After the reaction is complete, the solvent is boiled off and the product crystallized from a suitable solvent such as methanol or other alcohol.

The following examples demonstrate the invention in greater detail. These examples are furnished only by way of illustration and not limitation.

Example I

One gram of 2,6-di-tert butyl-p-cresol and 2 drops of a 0.1% solution of cobalt naphthenate in ethyl acetate were dissolved in a mixture of 5 ml. of tert. butyl hydroperoxide and 10 ml. of tert. butanol. The mixture was heated on the steam bath for 20 minutes, the solvents were then evaporated and the product recrystallized from methanol. The product, 4-tert. butylperoxy-4-methyl - 2,6 - di - tert. butyl-cyclohexadiene-2,5-one-1 obtained in quantitative yield, had a melting point of 74° C. Analytical data in per cent:

Calculated: C, 74.0; H, 10.5. Found: C, 73.7; H, 10.5.

Formula of product:

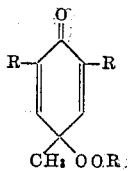

wherein R is tertiary butyl.

Example II

The process of Example I was repeated substituting for the 2,6-di-tert. butyl-p-cresol, the following phenols: (A) 2,2'-methylenebis(4-methyl, 6-tert. butyl)phenol and (B) 2,4-dimethyl-6-tert. butyl phenol, and (C) 2,4,6-trimethylphenol. The following compounds were obtained in quantitative yield:

A

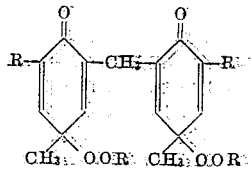

2,2'-methylenebis-(4-tert. butylperoxy, 4-methyl, 6 tert. butyl) cyclohexadiene-2,5-one-1.

B

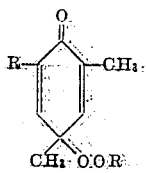

4-tert. butylperoxy-2,4-dimethyl-6-tert. butyl-cyclohexadiene-2,5-one-1.

C

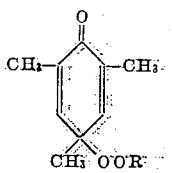

4-tert. butylperoxy-2,4,6-trimethyl-cyclohexadiene-2,5-one-1.

In the above formulae, R stands for tert. butyl. These compounds were all viscous liquids which could not be distilled because of decomposition.

Having thus described our invention, we claim:

1. A process for preparing an organic peroxide which comprises reacting, at a temperature from about 60° to about 100° C., an organic hydroperoxide with a 2,4,6-trialkyl phenol.

2. A process for preparing an organic peroxide which comprises reacting, at a temperature from about 60° to about 100° C., tert. butyl hydroperoxide with a 2,4,6-trialkyl phenol.

3. The process of claim 2 wherein the phenol reactant is 2,6-di tert. butyl-p-cresol.

4. The process of claim 2 wherein the phenol reactant is 2,4-dimethyl-6-tert. butyl phenol.

5. The process of claim 2 wherein the phenol reactant is 2,2'-methylenebis-(4-methyl, 6-tert. butyl) phenol.

6. The process of claim 2 wherein the phenol reactant is 2,4,6-trimethylphenol.

7. 4-tert. butylperoxy-4-methyl - 2,6 - di tert. butylcyclohexadiene-2,5-one-1.

8. 4-tert. butylperoxy-2,4-dimethyl - 6 - tert. butylcyclohexadiene-2,5-one-1.

9. 2,2'-methylenebis-(4-tert. butylperoxy, 4-methyl, 6-tert. butyl) cyclohexadiene-2,5-one-1.

10. 4-tert. butylperoxy-2,4,6-trimethyl-cyclohexadiene-2,5-one-1.

11. A compound selected from the group consisting of

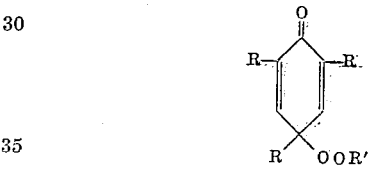

and

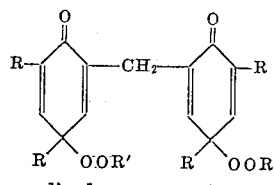

wherein the radicals represented by R are alkyl radicals and wherein the radicals represented by R' are selected from the group consisting of alkyl, aryl, cycloalkyl, and hydroxycycloalkyl radicals.

TOD W. CAMPBELL.
GALVIN M. COPPINGER.

No references cited.